Dec. 22, 1936.  A. L. V. C. DEBRIE  2,065,057
LIGHT CONTROL STRIP FOR CINEMATOGRAPHIC PRINTING MACHINES
Filed Feb. 28, 1935    3 Sheets-Sheet 1
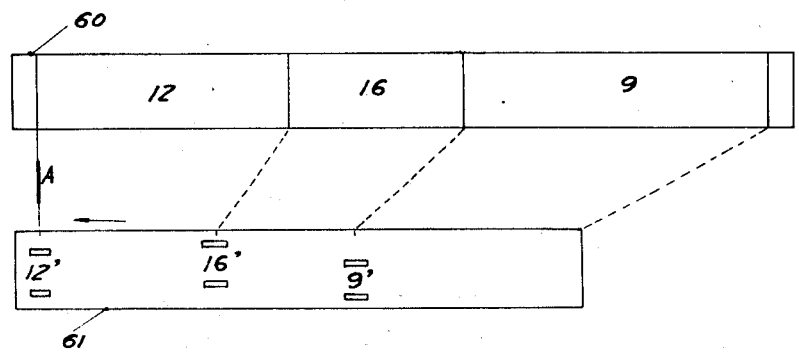
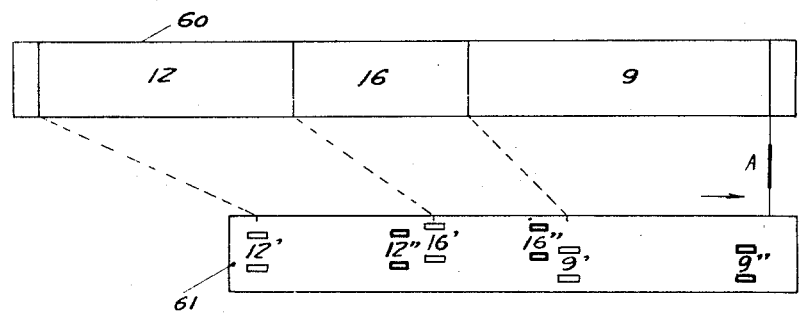
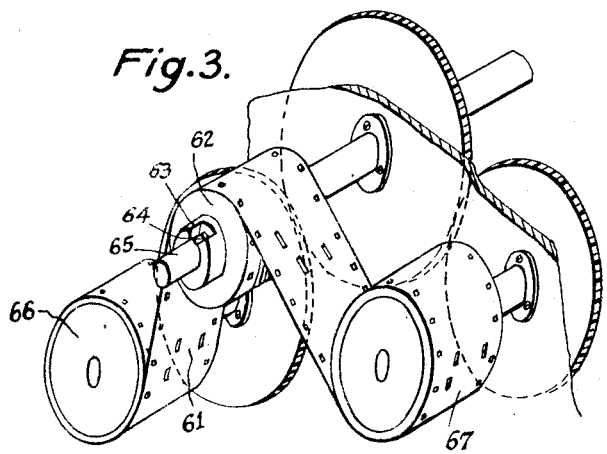

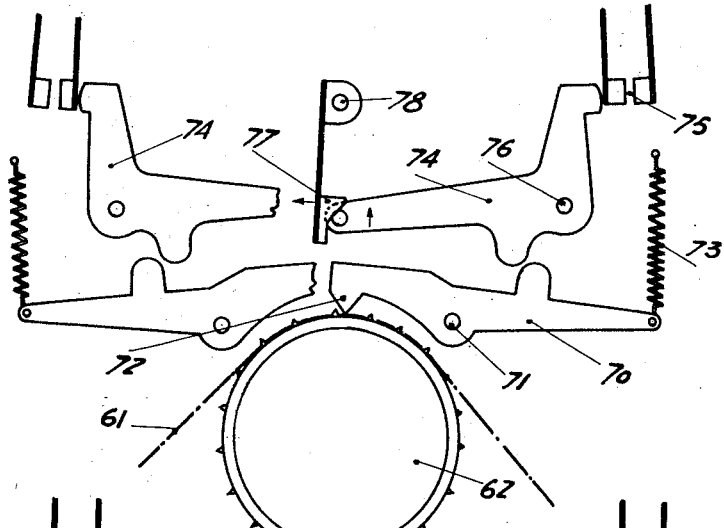
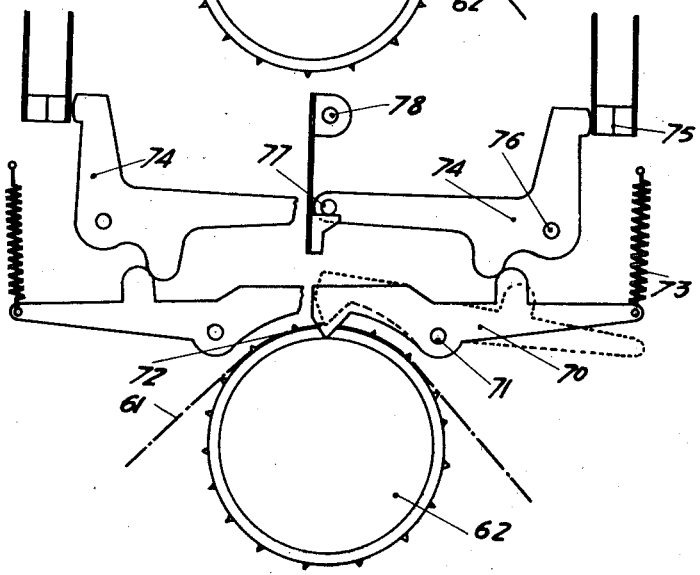

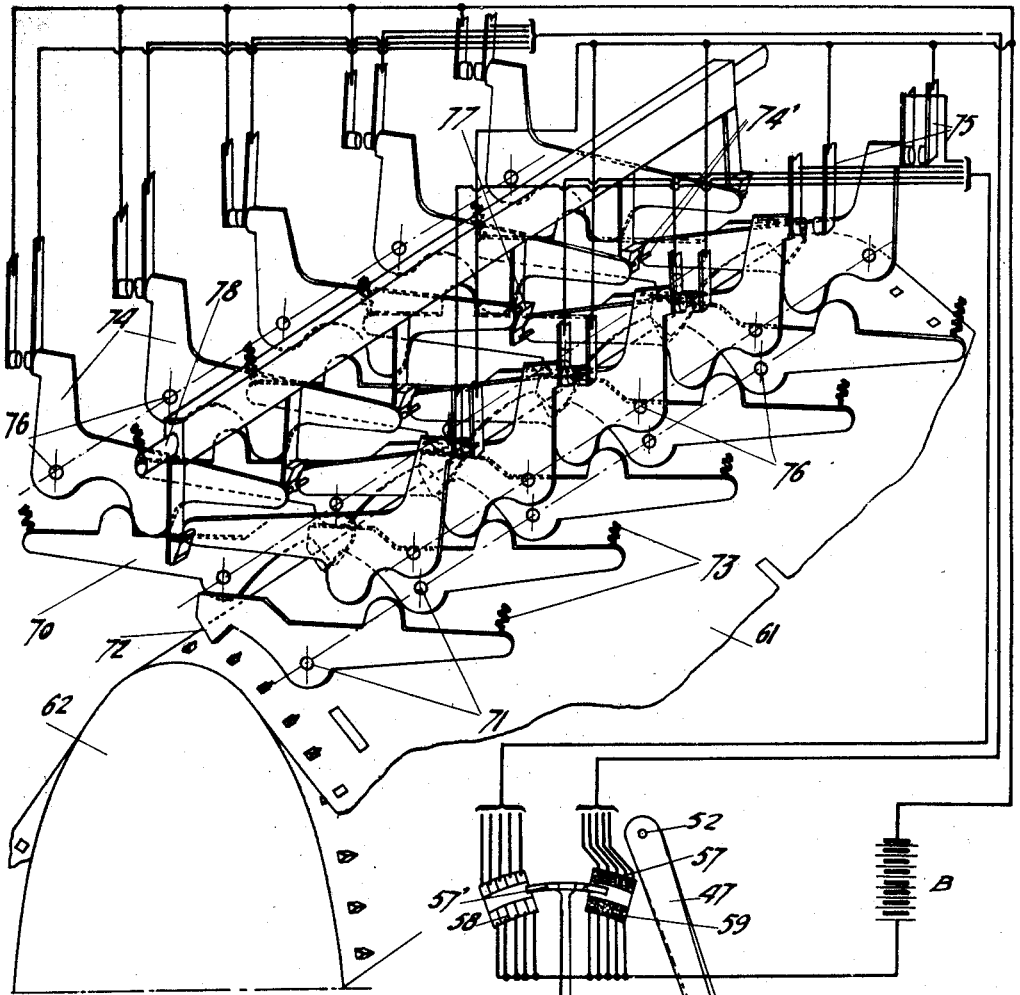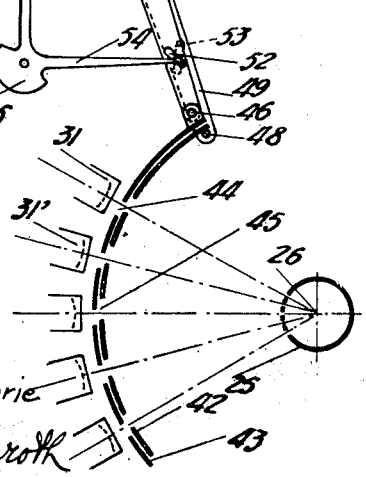
Fig. 6

Patented Dec. 22, 1936

2,065,057

UNITED STATES PATENT OFFICE 2,065,057

LIGHT CONTROL STRIP FOR CINEMATOGRAPHIC PRINTING MACHINES

André Léon Victor Clement Debrie, Paris, France

Application February 28, 1935, Serial No. 8,736
In France March 6, 1934

4 Claims. (Cl. 88—24)

My invention has for its object a release or control strip of the type used in cinematographic printing machines for providing the desired changes in intensity of the printing light. Such strips unwind at a speed proportional to the speed of unwinding of the positive and negative films and show notches which produce the desired changes of light at the required moments through insertion of resistances in the illuminating circuit or otherwise.

According to my invention, means are provided inter alia whereby the unwinding both of the films and of the control strip may be performed in either direction without modifying the correct correspondence between the scenes and the intensities of the printing light; furthermore the contact closed by the passage of a notch is held closed until the passage of the next notch.

I have shown by way of example in accompanying drawings a form of execution of my invention.

Fig. 1 discloses the corresponding subdivision of the negative film into scenes and of the control strip into sections providing different printing light values.

Fig. 2 shows how the subdivision of the control strip is modified in accordance with my invention so as to allow a correct control of changes of illumination when the negative film and the control strip advance in a direction opposite to that adopted in the case of Fig. 1.

Fig. 3 illustrates the arrangement providing the compensation required, at every change in the direction of progress, in the synchronism between the films and the control strip.

Figs. 4 and 5 show two different positions assumed by the control systems submitted to the action of the control strip.

Fig. 6 is a sectional view of a shutter system which may be used in combination with my improved control strip together with a perspective view illustrating the cooperation between the control strip and the double illumination controlling lever system, a section of which is shown in Figs. 4 and 5.

The negative film 60 (Figs. 1 and 2) is divided into a certain number of scenes designated by the reference number such as 12—6—9 of the light required for its printing. The contact strip 61 the length of which is reduced with reference to that of the negative by reason of the reduced speed applied to it, is also divided into sections corresponding to the scenes on the negative and provided each at their beginning with notches 12'—16'—9' providing the illuminations 12—6—9 required by the opacity of the negative for the corresponding scenes. These notches are shown in thin lines on the figure and point A gives out the point of the strip where the contact for the first change of illumination is produced. It is apparent that when the negative and the strip move in the direction of the arrow in Fig. 1, the proper illumination will be provided by the contacts obtained through the notches 12'—16'—19' corresponding to the beginning of the scenes 12—6—9 to which they are shown on Fig. 1 as connected through dotted lines.

But if I cause the negative and the control strip to progress in the opposite direction to that given by the arrow, the illumination provided by the successive notches is, for each scene of the negative, say scene 12 for instance, the illumination, 16 in the case considered which is normally to cooperate with the adjacent scene preceding the scene considered during the movement which is being effected. Similarly the contact 9' will provide an illumination 9 for the scene 16 as apparent from the path of the dotted lines giving out the correspondence between the contacts and the beginning of the scenes on the negative.

In order to restore the desired concordance and provide reversibility for the control strip, I repeat the notches (or pairs of notches) at 16"—12"—9" as shown in thick lines at the end of each scene so that for a reversed progress such as that considered in Fig. 2, these further notches correspond to the beginning of their scene and ensure the correct illumination desired therefor. This illumination, produced by contact 12" for instance in the case of reversed progress is maintained until contact 12' becomes operative. But as this contact provides the same illumination, no change is perceived until 16" becomes operative and produces illuminations 16. A similar sequence is observed for the direct progress (that shown in Fig. 1).

As shown the second series of notches except notch 9" corresponding to the beginning of the first scene for reversed progress of the films are of necessity shifted with reference to their correct positioning by reason of the presence of the notches controlling the illumination of the adjacent scene for the direction of direct progress shown in Fig. 1. This shifting shows no drawback provided the following contrivance is made use of.

The sprocket drum 62 engaging with the control strip 61 has on its hub an angular recess 63 in which is housed a spigot 64 carried by the shaft 65 of the drum 62, which provides a predetermined play in the driving connection between said shaft and drum. On the other hand, the frictional drive 66 winds the strip with a traction greater than the resistance provided by the friction feed coil 67 (and reversely for the opposed direction of unwinding as the friction system is double) and consequently each time the direction of progress is reversed, the frictional drive causes the drum 62 to rotate through a complementary angle corresponding to a relative displacement of the spigot 64 inside the recess 63 from side to side thereof whereby compensation is afforded for the shifting in the change of illumination produced by the shifting of notches 12″—16″ corresponding to the reversed direction of unwinding. When direct progress is resumed the drum 62 is obviously caused to rotate backwards through the same angle with reference to its shaft so that the spigot 64 may abut against the active face of the recess 63 in the drum 62; the shaft 65, drum 62 and control strip 61 will then resume sychronous motion.

Fig. 4 shows diagrammatically the control mechanism of the change of illumination when the contact provided is broken and Fig. 5 shows the same mechanism with the contact provided by the strip kept closed in spite of continued progress of the notches strip.

Perspective Fig. 6 taken in combination with Figs. 4 and 5 shows the drum 62 driving the control strip 61 and two series of release levers 70 each mounted on a pivot 71 and provided with a tooth 72 adapted to engage the corresponding notch of the strip under the action of the return spring 73. The teeth 72 of the levers of the two series overlie points of the synchronizing drum 62 which are on a common generating line. A hook 74 adapted to rock round its pivot 76 under the action of the corresponding lever 70 ensures the closing of the corresponding contact 75 producing the change of illumination. A movable yielding stop 77 provided for each hook 74 keeps the latter in the position of contact shown in Fig. 1 until the following change of illumination brings the hook 74 back into its inoperative position shown in Fig. 4, this position of contact being retained in spite of the lever 70 having passed out of the notch as shown in dotted lines in Fig 5.

The arrangement described is repeated for each lever controlling a change of illumination; the movable stops 77 of the different levers are carried by a common rod 78. Thus each time one or several levers fall into the notch or notches passing underneath their teeth, the pins 74′ carried by the corresponding hook or hooks move out of their lower position with reference to the yielding stop as shown in Fig. 4 and snap into their higher position as shown in Fig. 5. This movement causes a slight rocking of the system of stops 77 so that the pin or pins, held in their upper position on one or more stops since the last operation of one or more levers, are thrown off said stop or stops before the pin or pins considered have come definitely into their upper position of rest on their stop or stops. Thus only these just actuated pin or pins remain in their upper operative position as soon as they have reached it, even when the corresponding lever or levers have disengaged their notch.

Fig. 6 shows the illumination changing means which may advantageously cooperate with the control strip described. It comprises two arcuate shutters 42—43 independent from one another and arranged at a small distance from the object glasses 31—31′. Each shutter is provided with slots respectively 44—45 which allow the passage for more or less light according as to whether they are more or less in register. The shutters are adapted to move independently round the source of light 26. The shutter 43 is connected at 46 with a lever 47 and the shutter 44 is connected at 48 with a lever 49; the levers 47 and 49 are rotatably mounted on a common pivot 51. Each lever has an oblique slot 52, 53 forming a cam, the slopes of the slots being opposed. These two slots are simultaneously engaged by a projection carried at the end of a bell crank 54 provided with a counterweight 55, the other end of which carries an arcuate lever 57—57′ adapted to move in the coils 58—59. Each coil is divided into say five fractions independently fed with current.

Moreover the arcuate lever 57—57′ forms two magnetic cores insulated one with reference to the other. The coils are set with reference to the cores in a manner such that one fraction of coil 59 lies in front of the magnetic center of the core 57, the corresponding fraction of the coil 58 being shifted through half its width with reference to the magnetic center of the core 57′.

Consequently when current is sent alternatively into one fraction of one coil and into the corresponding fraction of the other coil, the core moves each time through half the width of a fraction and it is thus possible to obtain ten different positions for the bell crank 54 and thereby ten different relative positions of the shutter 42—43.

The feed currents of the coils is sent through the battery B and the contacts 75 selectively controlled by the control strip as described hereinabove.

What I claim:

1. A device for control of illumination in film printing comprising a strip divided into sections corresponding to the successive film scenes to be printed and provided at the beginning and end of each section with notches, the distance of the notches from the edges of the strip being the same for the notches of the same section, frictional driving means for said strip, a drum positively engaging the strip and provided with an outwardly flaring angular recess at its inner periphery, a shaft adapted to rotate in either direction at a speed proportional to and smaller than that of the negative being printed and carrying said drum, a projection integral with said shaft housed in the recess of the drum and adapted to engage either side of said recess and a lever system adapted to engage the successive notches and to selectively control the printing illumination according to the notch engaged.

2. A device for control of illumination in film printing comprising a strip divided into sections corresponding to the successive film scenes to be printed and provided at the beginning and end of each section with notches, the distance of the notches from the edges of the strip being the same for the notches of the same section, means including a drum adapted to drive the strip in either direction at a speed proportional to that of the printing process, a plurality of levers overying the points of passage of the strip notches over a line corresponding with a generating line of the drum, pivots for the levers adapted to allow momentary engagement of the latter with the notches passing underneath them, a rocking part controlled by each lever, illumination controlling circuits adapted to be controlled by said rocking parts and means for retaining the rocking parts in their operative position during the interval separating the passage of two successive notches.

3. A device for control of illumination in film printing comprising a strip divided into sections corresponding to the successive film scenes to be printed and provided at the beginning and end of each section with notches, the distance of the notches from the edges of the strip being the same for the notches of the same section, means including a drum adapted to drive the strip in either direction at a speed proportional to that of the printing process, a plurality of levers overlying the points of passage of the strip notches over a line corresponding with a generating line of the drum, pivots for the levers adapted to allow momentary engagement of the latter with the notches passing underneath them, a rocking part controlled by each lever, illumination controlling circuits adapted to be controlled by said rocking parts and a yielding stop system on which the rocking parts are adapted to be rocked into operative position under the action of the levers, said rocking parts being adapted to fall off said stop system as soon as the next rocking parts begin engaging said system.

4. A device for control of illumination in film printing machines comprising a comparatively short strip divided into sections corresponding to the successive film scenes to be printed and provided both at the beginning and end of each section with notches, the distance of the notches from the edges of the strip being the same for the notches of the same section, means adapted to drive the strip in either direction at a speed proportional to and smaller than that of the negative in the printing process and a lever system adapted to engage the successive notches and to successively and automatically control the printing illumination corresponding to the notch engaged.

ANDRÉ LÉON VICTOR CLEMENT DEBRIE.